(12) United States Patent
Lanini

(10) Patent No.: US 6,496,592 B1
(45) Date of Patent: Dec. 17, 2002

(54) METHOD FOR TRACKING MOVING OBJECT BY MEANS OF SPECIFIC CHARACTERISTICS

(75) Inventor: Nicola Lanini, Zurich (CH)

(73) Assignee: Oerlikon Contraves AG, Zurich (CH)

( * ) Notice: Subject to any disclaimer, the term of this patent is extended or adjusted under 35 U.S.C. 154(b) by 0 days.

(21) Appl. No.: 09/352,475

(22) Filed: Jul. 13, 1999

(30) Foreign Application Priority Data

Jul. 13, 1998 (CH) ............................................. 1492/98

(51) Int. Cl.[7] ................................................. G06K 9/00
(52) U.S. Cl. ....................... 382/103; 382/106; 382/107; 348/169; 235/411
(58) Field of Search ................................. 382/103, 106, 382/107, 260–265, 199; 348/169; 235/411

(56) References Cited

U.S. PATENT DOCUMENTS

| | | | |
|---|---|---|---|
| 4,396,903 A | * 8/1983 | Habicht et al. ................ 342/64 |
| 4,719,584 A | 1/1988 | Rue et al. | |
| 4,796,187 A | 1/1989 | North | |
| 4,849,906 A | 7/1989 | Chodos et al. | |
| 4,853,970 A | * 8/1989 | Ott et al. .................... 382/199 |
| 4,937,878 A | 6/1990 | Lo et al. | |
| 5,289,993 A | 3/1994 | McWilliams et al. | |
| 5,875,040 A | * 2/1999 | Matraszek et al. .......... 358/428 |
| 5,937,078 A | * 8/1999 | Hyland et al. ................. 342/90 |
| 5,982,930 A | * 11/1999 | Neff et al. ................... 382/103 |
| 6,031,568 A | * 2/2000 | Wakitani ..................... 348/169 |
| 6,128,396 A | * 10/2000 | Hasegawa et al. .......... 348/143 |
| 6,188,776 B1 | * 2/2001 | Covell et al. ................ 345/419 |
| 6,259,823 B1 | * 7/2001 | Lee et al. .................... 382/199 |
| 6,295,367 B1 | * 9/2001 | Crabtree et al. ............ 382/103 |
| 6,298,144 B1 | * 10/2001 | Pucker et al. ................ 348/155 |
| 6,298,170 B1 | * 10/2001 | Morita et al. ................ 348/169 |
| 6,324,299 B1 | * 11/2001 | Sarachik et al. ............ 348/169 |

* cited by examiner

Primary Examiner—Joseph Mancuso
Assistant Examiner—Anand Bhatnagar
(74) Attorney, Agent, or Firm—Townsend and Townsend and Crew LLP; Guy W. Chambers

(57) ABSTRACT

A method for the detection and tracking of moving objects, which can be implemented in hardware computers, is described. The core of the described method is constituted by a gradient integrator (42), whose contents can be permanently refreshed with a sequence of image sections containing the target object. Different method steps for processing the image sections (26) reduce the number of required calculation operations and therefore assure sufficient speed of the method.

7 Claims, 2 Drawing Sheets

METHOD FOR TRACKING MOVING OBJECT BY MEANS OF SPECIFIC CHARACTERISTICS

FIELD OF THE INVENTION

The present invention relates to a method for detecting and tracking objects within digitized images on the basis of properties which clearly distinguish these objects from other structures appearing in the images.

BACKGROUND OF THE INVENTION

The automation of processes, as well as autonomously operating systems and devices used in processing technology and systems employed by the military, require the dependable detection of objects to be manipulated, as well as of obstacles and targets, in particular highly developed partial systems contained in military systems for air defense for detecting the structure, position and direction of movement of aircraft, whose relevant data must be available extremely rapidly in order to dependably counter any threat. Because such systems are customarily equipped with active sensors, in particular surveillance and tracking radars, weapons systems have been developed which can effectively negate such sensors by using their radiation for their own target detection. Passive detection of targets is performed in the traditional way by appropriately trained personnel.

Besides the considerable outlay for training such personnel, the limited reaction speed of humans as well as the endangerment of the personnel employed at the targets which are attractive to the opponent should be mentioned as additional disadvantages.

Therefore several methods for detecting and tracking targets by extracting them from image data obtained from video and infrared cameras are already known. For example, a target can be detected within a section to be passed through an image, by comparing the statistical frequency of defined gray scale values in the section of a video image with that of the entire image. Besides the possibility of errors in the case of the presence of gray edges with corresponding gray scale value statistics extending through the entire image, there is the disadvantage that a certain minimum size of the object to be detected is required. This therefore cannot consist of only a few pixels of the entire image, so that the detection range of a video camera is even further removed from that of a surveillance radar.

The increase of the number of pixels by using special cameras also approaches a limit set by the speed with which calculations can be performed in the processors used. The first such methods are mainly reflected in the hardware, which was adapted to the specific use for achieving a high calculation speed.

Possible improvements of the method therefore resulted in an inordinate outlay because of the required adaptation of the hardware. Since implementations of such methods by providing the corresponding software for very fast and universally usable hardware have only very recently become possible at all, the special requirements for such implementable methods lie in their economical structure in respect to the volume of the required calculating operations.

OBJECT AND SUMMARY OF THE INVENTION

It is therefore the object of the invention hereinafter described to assure the detection and tracking of targets in digitized images with a minimal outlay for calculating operations, while avoiding the described disadvantages of the prior art.

Methods in accordance with the prior art use a relatively large area for detecting gray scale values and similar characteristics in order to extract a target from an image. But the method in accordance with the invention uses only certain elements from the total amount of image pixels containing the target. These are moreover obtained by transformations of the actual amount of target pixels and their additional reduction to essential pixels. A characteristic pattern of the target obtained by this is employed in subsequent images for tracking by correlating it with all the pixels of an image section to be searched, wherein the correlation maximum indicates the new position of the target. The characteristic pattern of the target is furthermore continuously updated by means of an integration process in order to take into account changes in the target profile, for example if an aircraft rotates around its axis in the course of making turns.

A considerable advantage of the method in accordance with the invention lies in minimizing the calculation efforts required for detecting a target, establishing its pattern and tracking it, which consists of minimizing the number of pixels to be processed.

A further advantage is the result of the high degree of dynamics of the system in regard to the extension of the objects to be detected. Therefore it is possible by means of the described method steps to reduce an extended object to a few significant image pixels. However, since only a few pixels are required for identifying a target, it is also possible by means of the method of the invention to detect and track targets which only include a few unprocessed pixels. Therefore the possibility also exists of detecting and tracking guided missiles and drones without the employment of active sensors.

Further details, characteristics and advantages of the invention ensue not only from the claims and the characteristics to be taken from them, either by themselves and/or in combination, but also from the following description of preferred exemplary embodiments.

DETAILED DESCRIPTION OF THE PREFERRED EMBODIMENTS

Figure 1:
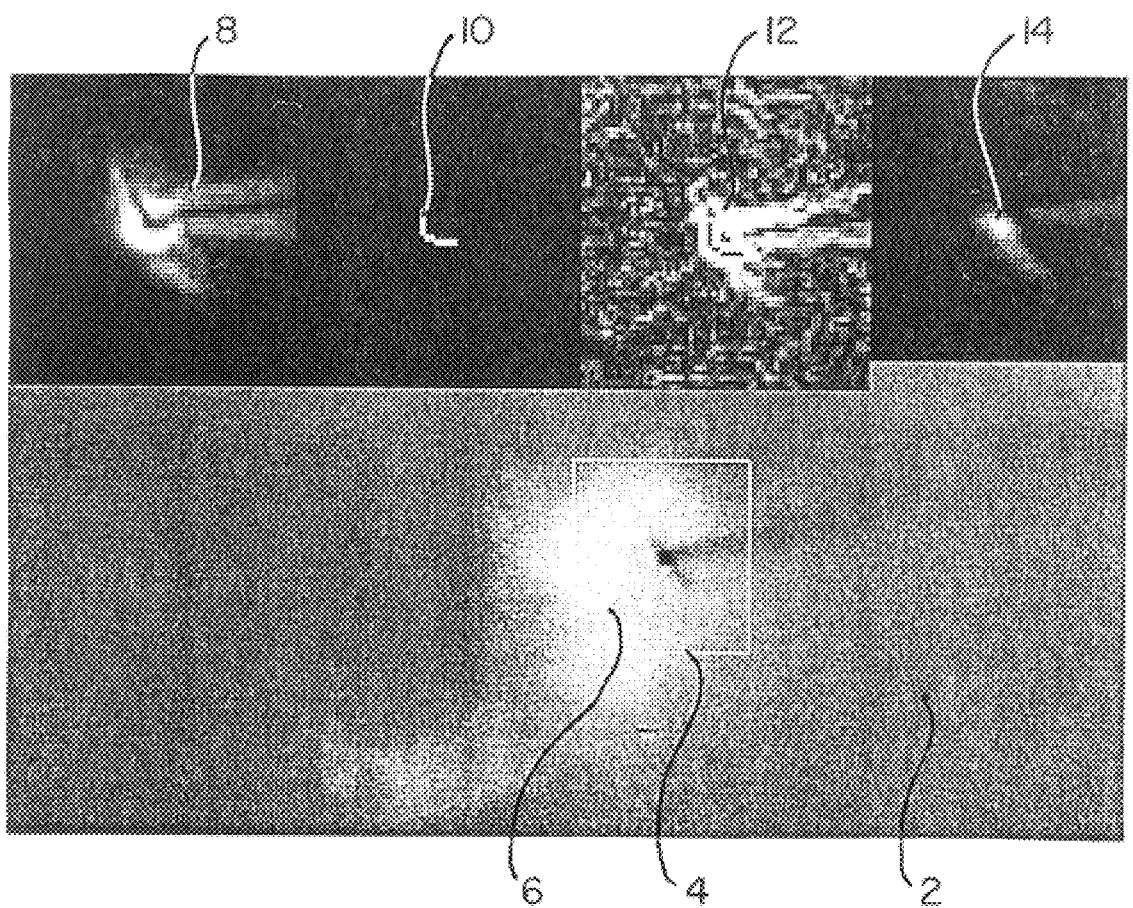
FIG. 1 is a representation of a target 2 within a search window 4, as well as various processing steps 6 within this search window.

The image section 8 shown in FIG. 1 represents the contents of a gradient integrator, in which image pixels, which are the result of previous gradient images, have been stored. In gradient images, the gray scale values of the individual pixels are replaced by the differences of the gray scale values between the respective image pixel and the immediately adjacent image pixel both in the horizontal and the vertical directions. Because respective noise components in the gray scale values of the original images can even be emphasized by gradient formation, first the original images are subjected to a smoothing Gaussian filtering. The integration process takes place in that initially the gradient image, which follows the gradient image which was first loaded into the gradient integrator, is added pixel by pixel with a weighting factor k, wherein the image pixels of the existing image are entered with the weighting factor 1−k. The image section 10 represents a pattern of the target to be tracked, made from the data of the image section 8. The derivation of the pattern from the contents of the gradient integrator represented in the image section 8 takes place by determining the pixels of the image section 8 which represent local extremes. All pixels having neither a local maximum or minimum value are written over with the value zero. Thereafter, this image is correlated by pixel by pixel multiplication with the data of an actual smoothed gradient image, wherein local as well as an absolute maximum of the correlation process results from the mutual displacement of the pixels of both images.

The gradient image of the actual image 18 is represented with the overlaid pattern in the image section 12. The local relationship between the gradient image and the pattern is represented by the correlation maximum. The image section 14 shows the geometric course of the correlation progression which is valid for the actual image and pattern and represents a result which, though it is more definite, has been achieved with an incomparably greater calculation effort by means of a Hough transformation. After correcting the positional error of the target to be tracked, which can be recognized in the image section 12, the actual gradient image, on which the image section 12 is based, is entered with the weighting factor k into the gradient integrator for updating the data represented in the image section 8, from which subsequently the updated data of the pattern represented in the image section 10 are calculated, which thereafter are correlated with the data of a subsequent gradient image.

Figure 2:
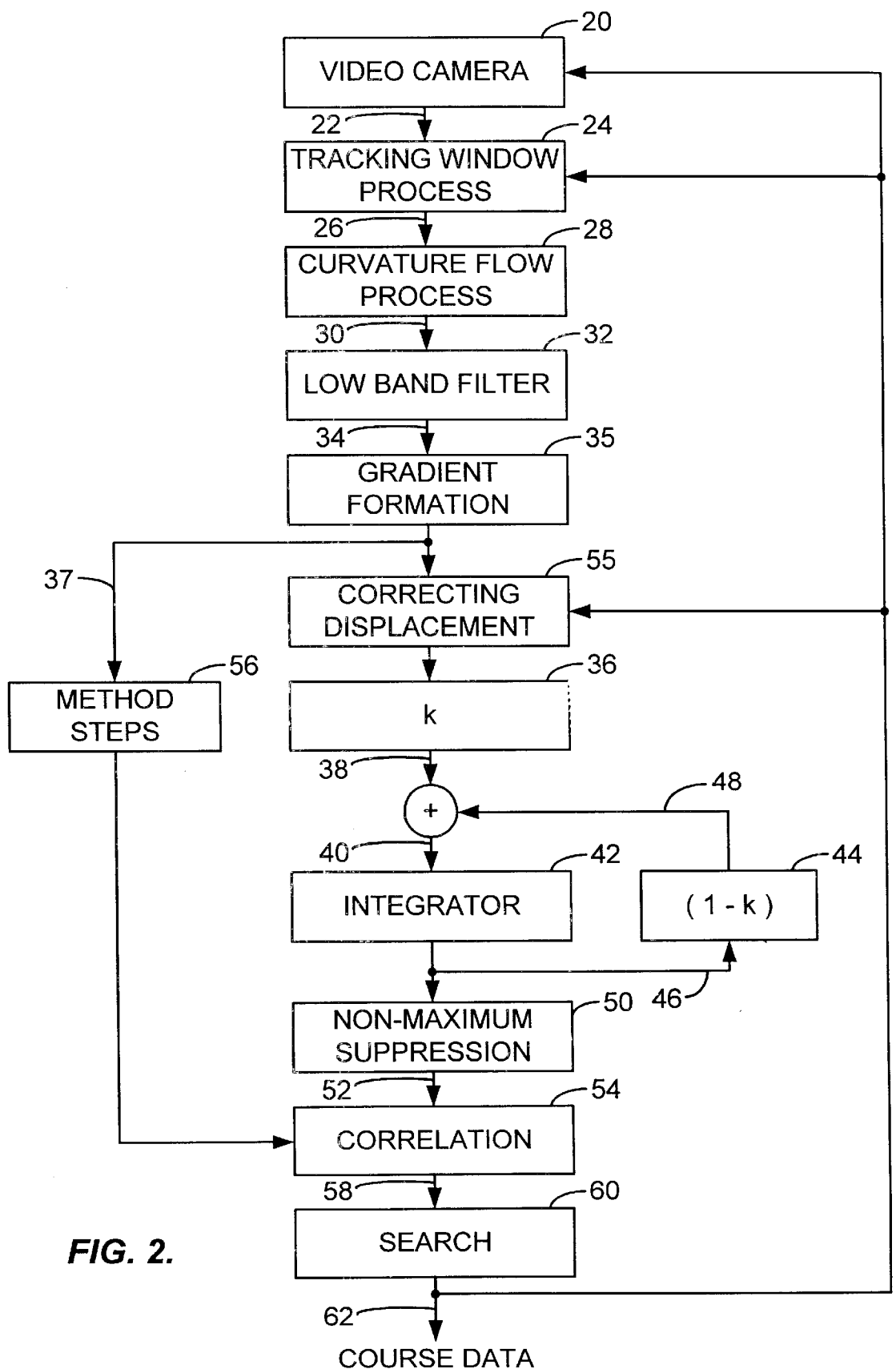
FIG. 2 is a block diagram describing a method for tracking a target.

By means of a block diagram, FIG. 2 explains the method which was described by means of the respective image sections. A video camera 20, which can also be replaced by an infrared camera or other image-producing sensors suitable for this, generates a chronologically sequential series of video images 22, from which an image section 26 is extracted by assignment of a superordinated system, or by means of data determined by the described method by an appropriate process.

The image section 26 is a gray scale value image, whose curvature flow is evaluated and from which too fine structures are removed by a mean curvature flow process 28. By means of a convolution with an appropriately weighted matrix, the appropriately processed image section 30 is thereafter subjected to a Gauss-like low bandpass filtering 32 in order to eliminate very small structures created in the image section by the mean curvature flow processing, as well as noise components. For reasons of its expense, this process is preferably performed only once at the start and for initializing the method.

An image section 34 resulting from this is then used as the input value in a method step designated as gradient formation 35. Here, the differences of the gray scale values of the adjoining image pixels are used for a comparison with the respective image pixel, in which the change in the gray scale value at the transition to adjoining image pixels is stored, instead of the absolute gray scale value. In a specially adapted method of the invention, all image pixels located outside of a defined close vicinity of the target object are set to the value zero.

The gradient image 37 resulting from this is subjected to a shift by means of the target course data 62 obtained in the previous correlation process and is multiplied pixel by pixel by a factor k in a method step identified as weighting 36 in order to be thereafter added up pixel by pixel with an integrator image 46 derived from an integrator 42 and multiplied pixel by pixel in a weighting 44 by a factor 1–k, wherein a gradient image 40 being generated from this is loaded as an updated gradient image into the gradient integrator 42.

In actual use, a further task actually performed is the horizon suppression by means of the so-called horizontal or vertical edge suppression.

In a method step defined as a non-maximum suppression 50, all pixels which do not represent a local minimum or maximum in their vicinity are removed from the actual integrator image 46.

In methods of the invention which are adapted to special purposes, all pixels which fall below the maximum of the value of a pixel contained in the image by a defined, useful factor, are overwritten with the value zero.

Furthermore, in special embodiments only adjoining line-forming pixels of a value not equal to zero are considered, which do not fall below the maximum length of the lines in the image section by a defined, useful factor. In an image section which should be identified as a pattern 52 of a target, relatively few image pixels, which cover the edges of a gradient image of the target, remain because of this, all other pixels are assigned the value zero. Tracking of the target takes place in a method step identified as correlation 54. In this case a pattern 52 is multiplied pixel by pixel with a gradient image 37, taking into consideration the signs of the individual pixels, wherein the gradient image 37 used has not had an effect on the contents of the gradient integrator 42 and is laterally displaced in several method steps 56 in respect to the pattern 52. The pixel values of a two-dimensional correlation signal 58 obtained from this consist of the sum of the products between the pixel values of the correspondingly displaced gradient image 37 and the pattern 52, and the signal 58 is searched for an absolute maximum in the method step of a search 60 for a maximum, whose coordinates result in target course data 62 inside of the image section. These are passed on to downstream connected systems and are used for a correcting displacement 55 of subsequent gradient images, for the mechanical tracking of the video camera 20 as well as for tracking the extraction of the tracking window 24.

The connected changes of the gray scale values of the image pixels of a target are processed in the method of the invention, accordingly, there is a potential interference of such edges in the background of an image.

However, generally a moving target is detected and tracked in front of an immovable background. But borderline cases result in connection with strong horizontal edges, which correspond to the global direction of movement of a flying object, as well as in case of objects moving toward the video camera. To reduce these interferences, values in gradient images 37, which exceed the maximum value in the actual integrator image 46 stored in the gradient integrator 42 by a factor to be determined, are written over with the value zero.

What is claimed is:

1. A method for tracking a moving aerial target on a base of timely variable specific target image features for obtaining target course data, the method comprising the steps of:

providing (20) a series of images (22);

selecting at least one of the images as a selected image;

extraction (24) of an image section (26) of the selected image;

generation (35) of a gradient selected image (37) of each extracted image section (26 through 34);

shifting (55) of the gradient selected image (37) to obtain a shifted gradient selected image;

weighting (36) of the shifted gradient selected image by a factor (k) for obtaining a weighted gradient image (38);

providing a gradient integrator (42) having a preceding provided image (48) according to the selecting, extraction, generation, shifting, and weighting steps;

weighting the preceding provided image by a factor of (1−k) to obtain a weighted preceding provided image;

addition (+) of the weighted gradient image (38) to the weighted preceding provided gradient image (48) for obtaining a resulting gradient image (40);

loading of the resulting gradient image (40) into the gradient integrator (42), for obtaining an actualized gradient image (46);

correlation (54) of the actualized gradient image (46) with a further gradient image (37) generated from a subsequently provided selected image (22) and displaced (56) prior to correlation (54), to obtain a correlation signal (58); and conducting a maximum search (60) in the correlation signal (58), for obtaining target course data.

2. The method in accordance with claim 1, wherein processing the image section (26) is done by a mean curvature process (28) for initializing the method.

3. The method in accordance with claim 1, wherein processing the image section (26) is subjected to a Gauss-like low pass filtering (32).

4. The method in accordance with claim 1, wherein obtaining a pattern of the tracked target by means of non-maximum suppression (50) of the integrator gradient image.

5. The method in accordance with claim 4, wherein reducing image pixels of patterns to image pixels having a minimum value; and, writing over all remaining image pixels with the value zero.

6. The method in accordance with claim 4, wherein searching the image pixels for patterns for their connected in lines of a preselected minimum length; and, writing over all image pixels having a value which is not equal to zero and which are not connected in a line of a preselected minimum length with the value zero.

7. The method in accordance with claim 1, wherein writing over values in gradient images, which values exceed the maximum value in the integrator image stored in the gradient integrator by a preselected value with the value zero.

* * * * *